(12) United States Patent
Hwang et al.

(10) Patent No.: US 8,286,038 B2
(45) Date of Patent: Oct. 9, 2012

(54) METHOD AND APPARATUS FOR MANAGING DISC DEFECTS USING UPDATEABLE DMA, AND DISC THEREOF

(75) Inventors: Sung-Hee Hwang, Seoul (KR); Jung-Wan Ko, Suwon-si (KR); Kyung-Geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/301,014

(22) Filed: Nov. 21, 2011

(65) Prior Publication Data

US 2012/0063285 A1    Mar. 15, 2012

Related U.S. Application Data

(63) Continuation of application No. 12/233,710, filed on Sep. 19, 2008, now Pat. No. 8,090,998, which is a continuation of application No. 10/529,691, filed on Mar. 29, 2005, now Pat. No. 7,451,364.

(30) Foreign Application Priority Data

Oct. 18, 2002  (KR) .................... 10-2002-0063851
Dec. 13, 2002  (KR) .................... 10-2002-0079754
Oct. 14, 2003  (WO) ................ PCT/KR2003/002121

(51) Int. Cl.
*G11C 29/00* (2006.01)
(52) U.S. Cl. .................................. 714/710; 714/54
(58) Field of Classification Search ............... 369/47.14, 369/53.17, 53.36; 714/724, 710, 54
See application file for complete search history.

(56) References Cited

U.S. PATENT DOCUMENTS

| | | | |
|---|---|---|---|
| 5,448,728 | A | 9/1995 | Takano et al. |
| 5,533,031 | A | 7/1996 | Dounn |
| 6,198,709 | B1 | 3/2001 | Shirane |
| 6,341,109 | B1 | 1/2002 | Kayanuma |
| 6,367,038 | B1 | 4/2002 | Ko |
| 6,377,524 | B1 | 4/2002 | Ko |

(Continued)

FOREIGN PATENT DOCUMENTS

CN        1274462 A        11/2000

(Continued)

OTHER PUBLICATIONS

Office Action issued by Japanese Patent Office in Japanese Patent Application No. 2004-545035 on Jun. 9, 2009.

(Continued)

*Primary Examiner* — David Ton
(74) *Attorney, Agent, or Firm* — NSIP Law

(57) ABSTRACT

A reproducing apparatus is provided. The reproducing apparatus includes a recording/reading unit that records data on or reads data from a disc including a defect management area in which defect information regarding data recorded in a data area of the disc and defect management information for managing the defect information are repeatedly recorded, and a controller that controls the recording/reading unit to read the defect information and the defect management information from the defect management area, and read data from the disc using the defect information. First defect information, which is repeatedly recorded, includes second defect information which is recorded in a predetermined area and defect information regarding a defective block occurring after the second defect information is recorded. The defect management information includes location information of the defect information.

1 Claim, 12 Drawing Sheets

U.S. PATENT DOCUMENTS

| | | |
|---|---|---|
| 6,377,526 B1 | 4/2002 | Vining et al. |
| 6,601,201 B1 | 7/2003 | Kato |
| 6,662,309 B2 | 12/2003 | Ando et al. |
| 6,754,860 B2 | 6/2004 | Kim et al. |
| 6,782,488 B1 | 8/2004 | Park |
| 6,963,523 B1 | 11/2005 | Park |
| 6,978,404 B2 | 12/2005 | Ueda et al. |
| 7,051,054 B1 * | 5/2006 | Lee et al. ............ 1/1 |
| 7,088,648 B2 | 8/2006 | Park et al. |
| 7,233,550 B2 | 6/2007 | Park et al. |
| 7,489,604 B2 | 2/2009 | Park et al. |
| 7,630,283 B2 | 12/2009 | Park et al. |
| 2002/0136134 A1 * | 9/2002 | Ito et al. ............ 369/53.36 |
| 2007/0211591 A1 | 9/2007 | Park et al. |
| 2009/0122667 A1 | 5/2009 | Park et al. |
| 2009/0175141 A1 | 7/2009 | Park et al. |

FOREIGN PATENT DOCUMENTS

| | | |
|---|---|---|
| JP | 02-023417 | 1/1990 |
| JP | 11-066751 | 3/1991 |
| JP | 08-063895 | 3/1996 |
| JP | 9-190680 | 7/1997 |
| JP | 2000-173056 | 6/2000 |
| JP | 2000-268511 | 9/2000 |
| JP | 2000-357374 | 12/2000 |
| JP | 2001-014808 | 1/2001 |
| JP | 2006-500722 | 1/2006 |
| JP | 2006-512699 | 4/2006 |
| KR | 10-1999-0075796 | 10/1999 |
| KR | 2002-57729 | 7/2002 |
| KR | 2002-0087483 | 11/2002 |
| WO | WO 00/07185 A1 | 2/2000 |
| WO | WO 01/75879 A1 | 10/2001 |
| WO | WO 2004/029939 A1 | 4/2004 |
| WO | WO 2004/029941 A1 | 4/2004 |

OTHER PUBLICATIONS

Office Action issued in corresponding Korean Patent Application No. 10-2002-0079754 dated Apr. 17, 2009.

Office Action issued in Chinese Patent Application No. 200380101600.7 on Aug. 4, 2006.

U.S. Appl. No. 10/529,691, filed Mar. 29, 2005, Sung-Hee Hwang et al., Samsung Electronics Co., Ltd.

U.S. Appl. No. 12/233,710, filed Sep. 19, 2008, Sung-Hee Hwang et al., Samsung Electronics Co., Ltd.

* cited by examiner

METHOD AND APPARATUS FOR MANAGING DISC DEFECTS USING UPDATEABLE DMA, AND DISC THEREOF

CROSS REFERENCE TO RELATED APPLICATIONS

This application is a continuation of U.S. patent application Ser. No. 12/233,710, filed on Sep. 19, 2008, now allowed, which claims the benefit of continuation of U.S. Pat. No. 7,451,364, filed on Mar. 29, 2005, which claims the benefit of Patent Cooperation Treaty Application No. PCT/KR2003/002121 filed Oct. 14, 2003 in the Korean Intellectual Property Office, which claims priority to Korean Patent Application Nos. 2002-63851 filed on Oct. 18, 2002, and 2002-79754 filed on Dec. 13, 2002 in the Korean Intellectual Property Office, the entire disclosures of which are incorporated herein by reference for all purposes.

BACKGROUND

1. Field

The following description relates to disc defect management, and to a method of and an apparatus for managing disc defects using a defect management area (DMA) that can be updated, and a disc therefor.

2. Description of the Related Art

Defect management is a process of rewriting data stored in a user data area of a disc in which a defect exists. The data is rewritten to a new portion of the disc's data area, thereby compensating for the data loss caused by the defect. In general, defect management is performed using linear replacement or slipping replacement. In linear replacement, the user data area in which a defect exists is replaced with a spare data area having no defects. In slipping replacement, the user data area with the defect is marked, and data recording is slipped to a next user data area having no defects.

Both linear replacement and slipping replacement are applicable only to discs such as a DVD-RAM/RW, on which data can be repeatedly recorded and recording can be performed using a random access method. In other words, linear replacement and slipping replacement are difficult to apply to write once discs on which recording is allowed only once. In general, the presence of defects in a disc is detected by recording data on the disc and confirming whether or not data has been recorded correctly on the disc. However, once data is recorded on a write once disc, it is impossible to overwrite new data and manage defects therein.

After the development of CD-R and DVD-R, a high-density write once disc with a recording capacity of several dozen GBs was introduced. This type of disc can be used as a backup disc, since it is not expensive and allows random access that enables fast reading operations. However, defect management is not available for write once discs. Therefore, a backup operation is discontinued when a defective area, i.e., an area where a defect exists, is detected during the backup operation. In general, a backup operation is performed when a system is not frequently used, e.g., at night when a system manager does not operate the system. In this case, it is more likely that a discontinued backup operation will not be completed where a defective area of a write once disc is detected.

SUMMARY

In one general aspect, there is provided a reproducing apparatus including a recording/reading unit that records data on or reads data from a disc including a defect management area in which defect information regarding data recorded in a data area of the disc and defect management information for managing the defect information are repeatedly recorded, and a controller that controls the recording/reading unit to read the defect information and the defect management information from the defect management area, and read data from the disc using the defect information. First defect information, which is repeatedly recorded, includes second defect information which is recorded in a predetermined area and defect information regarding a defective block occurring after the second defect information is recorded. The defect management information includes location information of the defect information.

Other features and aspect may be apparent from the following detailed description, the drawings, and the claims.

Figure 1:
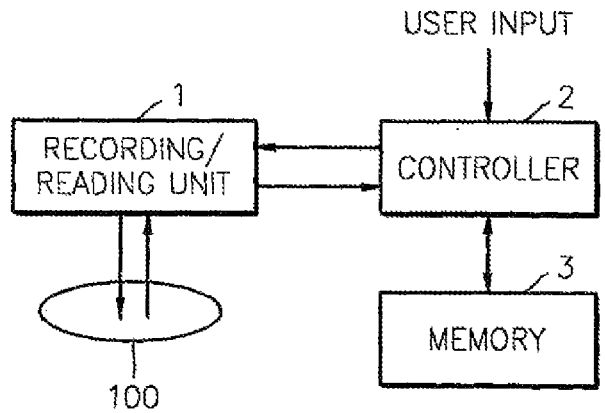
FIG. 1 is a block diagram illustrating an example of a recording apparatus according to a general aspect.

Throughout the drawings and detailed description, unless otherwise described, the same drawing reference numerals will be understood to refer to the same elements, feature, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a block diagram illustrating an example of a recording apparatus according to a general aspect. Referring to FIG. 1, the recording apparatus includes a recording/reading unit 1, a controller 2, and a memory 3. The recording/reading unit 1 records data on a disc 100, which is an information storage medium according to a general aspect, and reads back the data from the disc 100 to verify the accuracy of the recorded data. The controller 2 performs defect management according to a general aspect. In the embodiment shown in FIG. 1, the controller 2 uses a verify-after-write method in which data is recorded on a disc in predetermined units of data and the accuracy of the recorded data is verified to detect a defect in the data. In other words, the controller 2 records user data on the disc 100 in units of recording operations and verifies the recorded user data to detect an area of the disc 100 in which a defect exists. Thereafter, the controller 2 creates information that indicates a position of the area having the defect and stores the created information in the memory 3. Every time that such information is created, the controller 2 stores the created information in the memory 3. If the amount of the stored information reaches to a predetermined level, the controller 2 records the stored information as defect information on the disc 100.

Here, the recording operation is a unit of work determined according to a user's intention or is a recording work to be performed. According to this aspect, a recording operation indicates a process in which the disc 100 is loaded into the recording apparatus, data is recorded on the disc 100, and the disc 100 is taken out from the recording apparatus. During the recording operation, data is recorded and verified at least once. In general, data is recorded and verified several times. Defect information, which is obtained using the verify-after-write method, is temporarily stored in the memory 3.

When a user presses the eject button (not shown) of the recording apparatus in order to remove the disc 100 after recording of data, the controller 2 expects the recording operation to be terminated. Next, the controller 2 reads the information from the memory 3, provides the read information to the recording/reading unit 1, and controls the recording/reading unit 1 to record it on the disc 100.

The recording/reading unit 1 records the information provided from the controller 2 as defect information in a defect management area of the disc 100 and further records management information, which is used to manage the defect information, in the defect management area.

Figure 2A:
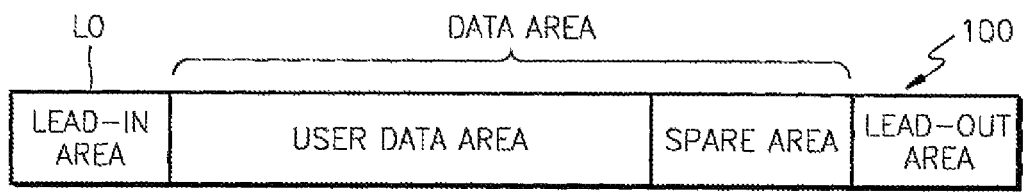
FIGS. 2A and 2B illustrate examples of structures of a disc according to general aspects.
Figure 2B:
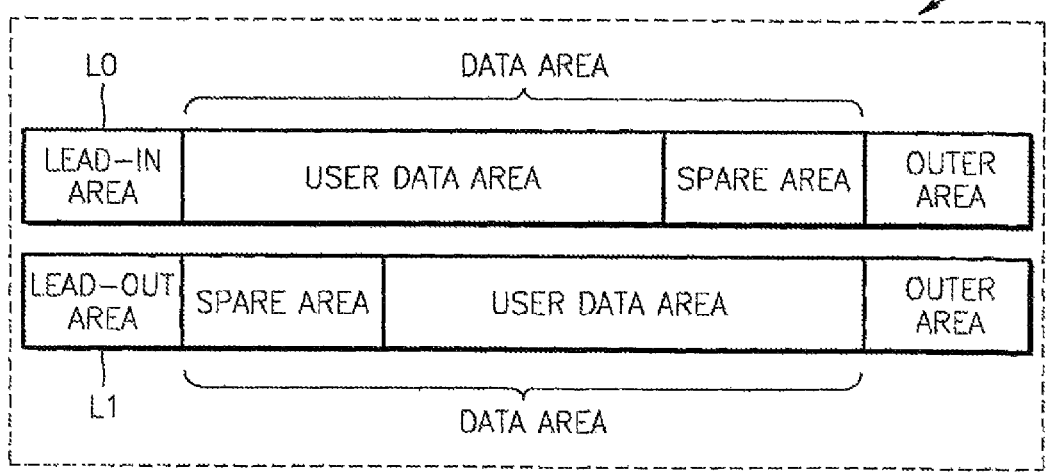

FIGS. 2A and 2B illustrate examples structures of the disc 100 of FIG. 1 according to general aspects. FIG. 2A illustrates in detail a single record layer disc representation of disc 100 having a record layer L0. The disc 100 includes a lead-in area, a data area, and a lead-out area. The lead-in area is located in an inner part of the disc 100 and the lead-out area is located in an outer part of the disc 100. The data area is present between the lead-in area and the lead-out area, and divided into a user data area and a spare area.

The user data area is an area where user data is recorded, and the spare area is the replacement area for a user data area having a defect, serving to compensate for loss in the recording area due to the defect. On the assumption that defects may occur within the disc 100, the spare area may be about 5% of the entire data capacity of the disc 100, so that a greater amount of data can be recorded on the disc 100.

FIG. 2B illustrates a double record layer embodiment of the disc 100 having two record layers L0 and L1. A lead-in area, a data area, and an outer area are sequentially formed from an inner part of the first record layer L0 to an outer part of the first recording layer. Also, an outer area, a data area, and a lead-out area are sequentially formed from an outer part of the second record layer L1 to an inner part of the second recording layer. Unlike the single record layer disc of FIG. 2A, the lead-out area is present in the inner part of the disc 100 of FIG. 2B. That is, the disc 100 of FIG. 2B has an opposite track path (OTP) in which data is recorded starting from the lead-in area of the first record layer L0 toward the outer area and continuing from the outer area of the second record layer L1 to the lead-out area at the inner part of the second recording layer. A respective spare area is allotted to each of the record layers L0 and L1.

In the aspect shown in FIG. 2B, the spare areas are present between the user data area and the lead-out area in the recording layer L1 and between the user data area and the outer area in the recording layer L1. If necessary, a portion of each user data area may be used as another spare area, that is, one or more additional spare areas may be present between the lead-in area and the lead-out area.

Figure 3A:
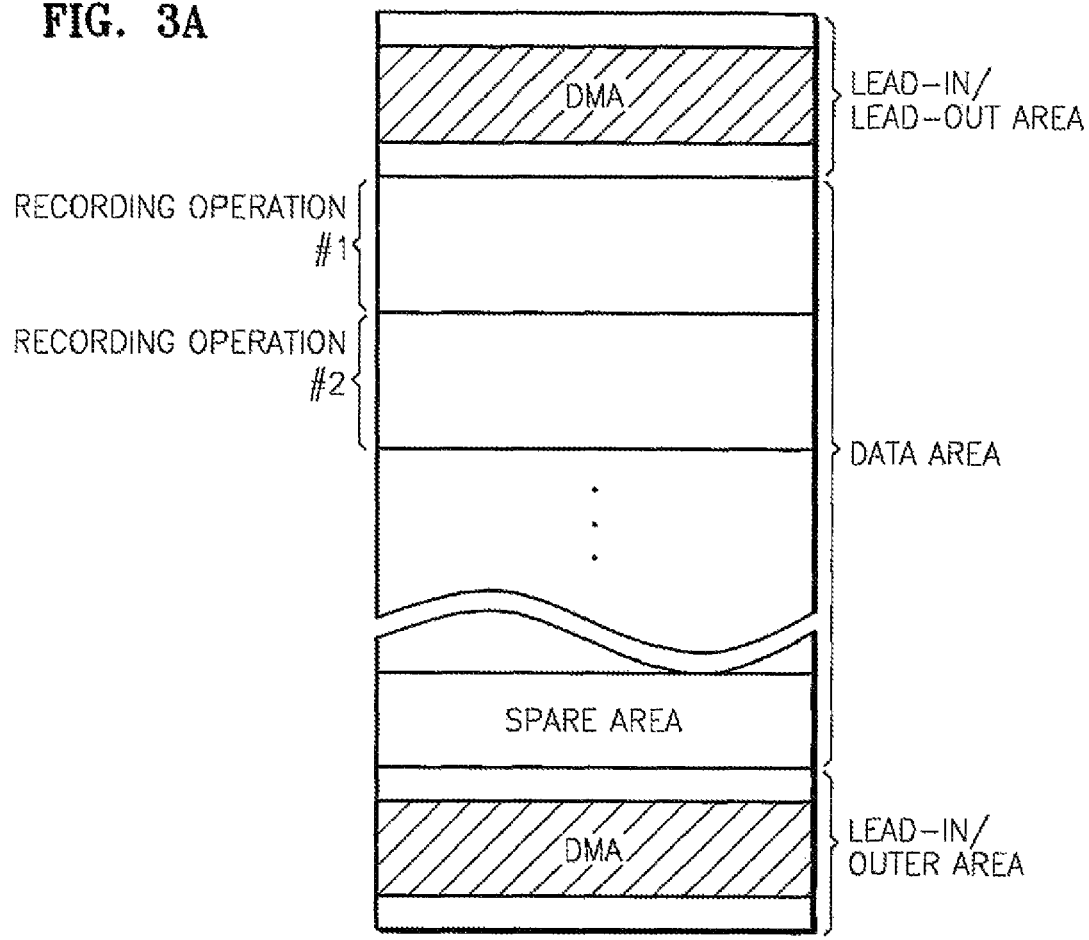
FIG. 3A illustrates examples of data structures of the disc of FIGS. 2A and 2B according to a general aspect.

FIG. 3A illustrates examples of data structures of the disc 100 according to a general aspect. Referring to FIG. 3A, if the disc 100 is a single record layer disc as shown in FIG. 2A, a defect management area (DMA) is present in at least one of the lead-in area or the lead-out area. If the disc 100 is a double record layer disc as shown in FIG. 2B, the DMA may be present in at least one of the lead-in area, the lead-out area, or the outer area. In the case of the double record layer disc shown in FIG. 2B, the DMA may be formed in at least one of the lead-in area or the lead-out area, which are located in the inner part of the disc 100.

In general, information that relates to managing defects in the disc 100 is recorded in the DMA. Such information includes the structure of the disc 100 for defect management, the position of defect information, whether defect management is performed or not, and the position and size of a spare area. In the case of a write once disc, new data is recorded after previously recorded data when the previously recorded data changes.

In general, when a disc is loaded into a recording/reading apparatus, the apparatus reads data from a lead-in area and a lead-out area of the disc to determine how to manage the disc and record data on or read data from the disc. However, if the amount of data recorded in the lead-in area/lead-out area increases, a longer time is spent on preparing the recording or reproducing of data after the loading of the disc. To solve this problem, a DMA is determined to be an area in which recorded information can be updated in aspect. That is, defect information and defect management information are updated and recorded in the DMA during every recording operation. Updating defect management information and defect information reduces the amount of information that the recording/reading unit requires for a recording/reproducing operation.

Since defect management is performed using linear replacement, the defect information includes information indicating the position of an area of the disc 100 having a defect and information indicating the position of an area of the disc 100 that is replacement for the area having the defect. For example, the defect management information further includes information indicating whether the area having the defect is a single defect block, or a continuous defect block in which physically continuous defects exist. The defect management information is used to manage the defect information and includes information indicating the point of the disc 100 where the defect information is recorded. For example, the defect management information further includes information indicating the position of user data that is most recently recorded in the user data area and a replacement area that is most recently formed in a spare area. Detailed data structures of defect information and defect management information are explained below.

The defect information and defect management information are recorded every time when a recording operation ends.

In the DMA, information regarding a defect occurring in data recorded during a first recording operation and information regarding a replacement area are recorded as defect information #1, and information regarding a defect occurring in data recorded during a second recording operation and information regarding a replacement area are recorded as defect information #2. Further, information for managing defect information #1 and #2 is recorded as defect management information #1 and #2, respectively, in the DMA. That is, generally, defect information #i may be used in association with a defect # i.

In the aspect shown in FIG. 3A, defect information #i further contains previously recorded defect information #1, #2, #3, . . . and #i−1, in addition to defect information #i. Therefore, a recording/reading unit can easily obtain defect information just by reading the most recently recorded temporary defect information #i and defect management information #i from the DMA.

In the case of a high-density disc with a recording capacity of several dozen GBs, it is desirable that a cluster is allocated to an area in which defect management information #i is recorded and four-eight clusters are allocated to an area in which defect information #i is recorded. This is because new information may be recorded in units of clusters to update information when a minimum physical unit of record is a cluster, although the amount of defect information #i is just several KBs. A total amount of defects allowed in a disc may be about 5 percent of the disc recording capacity. For instance, about four-eight clusters are required to record defect information #i, considering that information regarding a defect is about 8 bytes long and the size of a cluster is 64 KB.

The verify-after-write method may be performed on defect information #i and defect management information #i. When a defect is detected, information recorded in an area of a disc having a defect may be either recorded in a spare area using linear replacement, or recorded in an area adjacent to the area having the defect using slipping replacement.

Figure 3B:
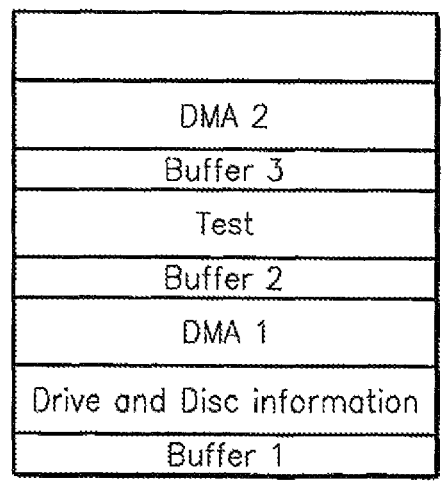
FIG. 3B illustrates an example of a disc with the defect management areas shown in FIG. 3A.

FIG. 3B illustrates an example of a disc with the defect management areas (DMAs) of FIG. 3A. If a disc is a single record layer disc as shown in FIG. 2A, the DMA is present in at least one of the lead-in area or the lead-out area of the disc. If the disc is a double record layer disc as shown in FIG. 2B, the DMA is present in at least one of the lead-in area, the lead-out area, or the outer area of the disc. For example, DMAs are present in the lead-in area and the lead-out area.

Referring to FIG. 3B, two DMAs are formed to increase the robustness of defect management information and defect information. In detail, a test area is an area that is used to measure recording conditions of data. A drive and disc information area contains information regarding a drive used during recording and/or reproducing operations and disc information indicating whether the disc is a single record layer disc or a double record layer disc. A first buffer area, a second buffer area, and a third buffer area act as buffers, i.e., they become borders between the other areas.

FIGS. 4A through 4D illustrate examples of data structures of a DMA according to general aspects.

Figure 4A:
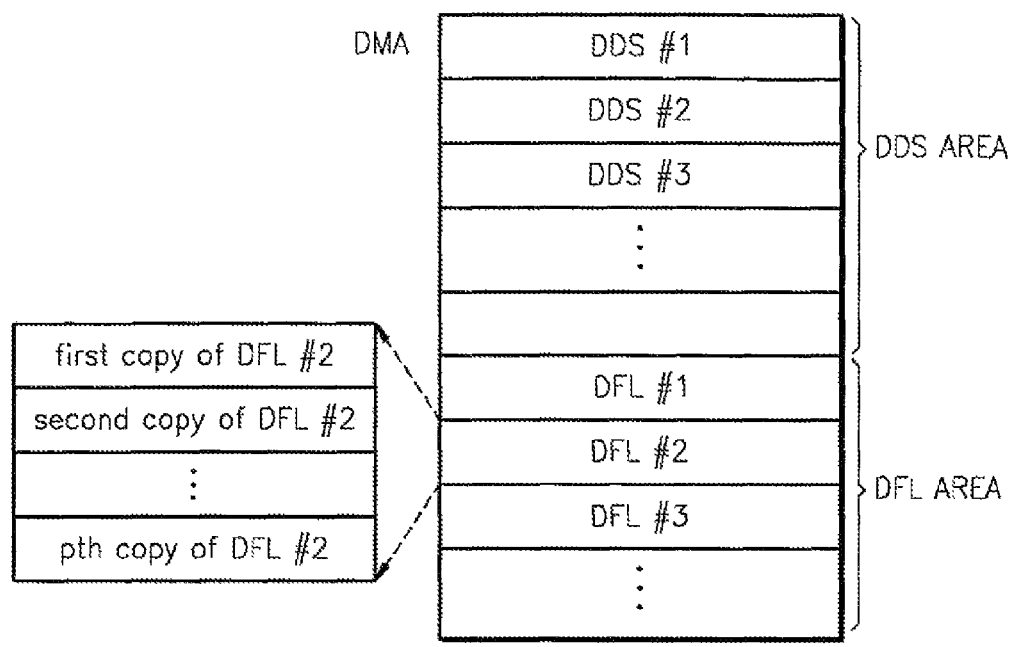
FIGS. 4A through 4D illustrate examples of data structures of a defect management area (DMA) according to general aspects.

Referring to FIG. 4A, a DMA is logically divided into a defect information area DFL and a defect management information area DDS. In the defect information area DFL, defect information lists DFL #1, DFL #2, DFL #3, . . . are sequentially recorded starting from the start of the defect information area DFL toward the end thereof. The defect information lists DFL #1, DFL #2, DFL #3, . . . are repeatedly recorded several times to increase the robustness of information. For example, as shown in FIG. 4A, the defect information DFL #2 is recorded P times (first copy through pth copy). Also, in the defect management information area DDS, defect management information DDS #1, DDS #2, DDS #3, . . . are sequentially recorded starting from the start of the defect management information area DDS. The defect management information DDS #1, DDS #2, and DDS #3 correspond to defect information lists DFL #1, DFL #2, and DFL #3, respectively.

Figure 4B:
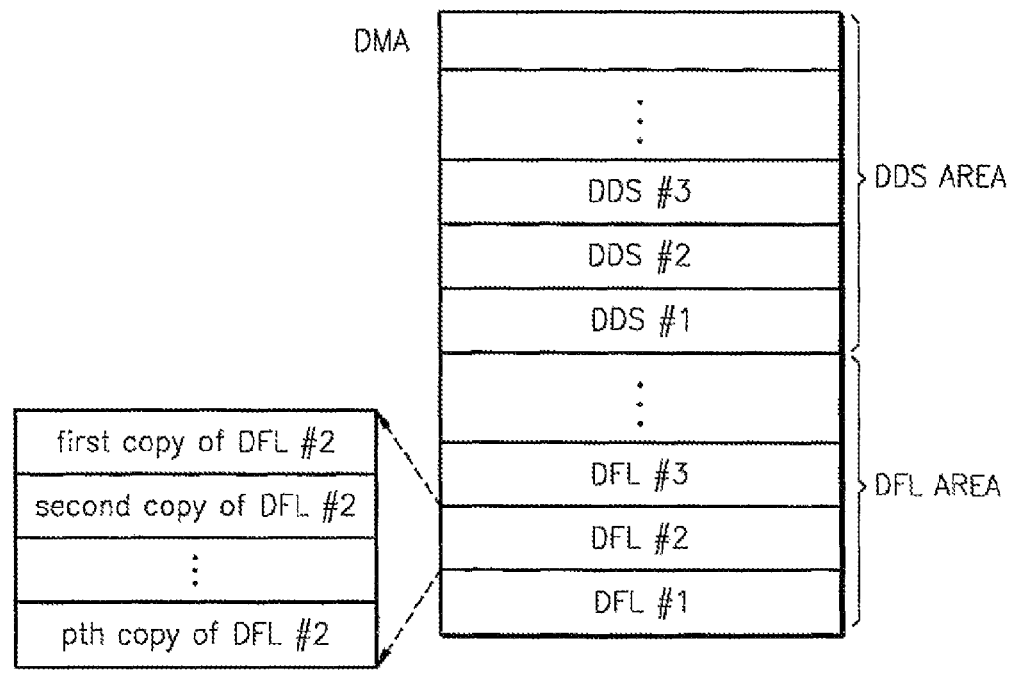

Referring to FIG. 4B, a DMA is logically divided into a defect information area DFL, and a defect management information area DDS, but the sequences of recording information are not the same as the sequences shown in FIG. 4A. For example, in the defect information DFL shown in FIG. 4B, defect information DFL #1, DFL #2, DFL #3, . . . are sequentially recorded starting from an end of the defect information area toward a start of the defect information area. In the defect management information area DDS, defect management information DDS #1, DDS #2, DDS #3, . . . are sequentially recorded starting from an end of the defect management information area DDS. Here, the defect management information DDS #1, DDS #2, and DDS #3 correspond to the defect information DFL #1, DFL #2, and DFL #3, respectively. Similarly, the defect information DFL #1, DFL #2, DFL #3, . . . are each recorded several times to increase the robustness of information. Referring to FIG. 4B, the defect information DFL #2 is recorded P times.

Figure 4C:
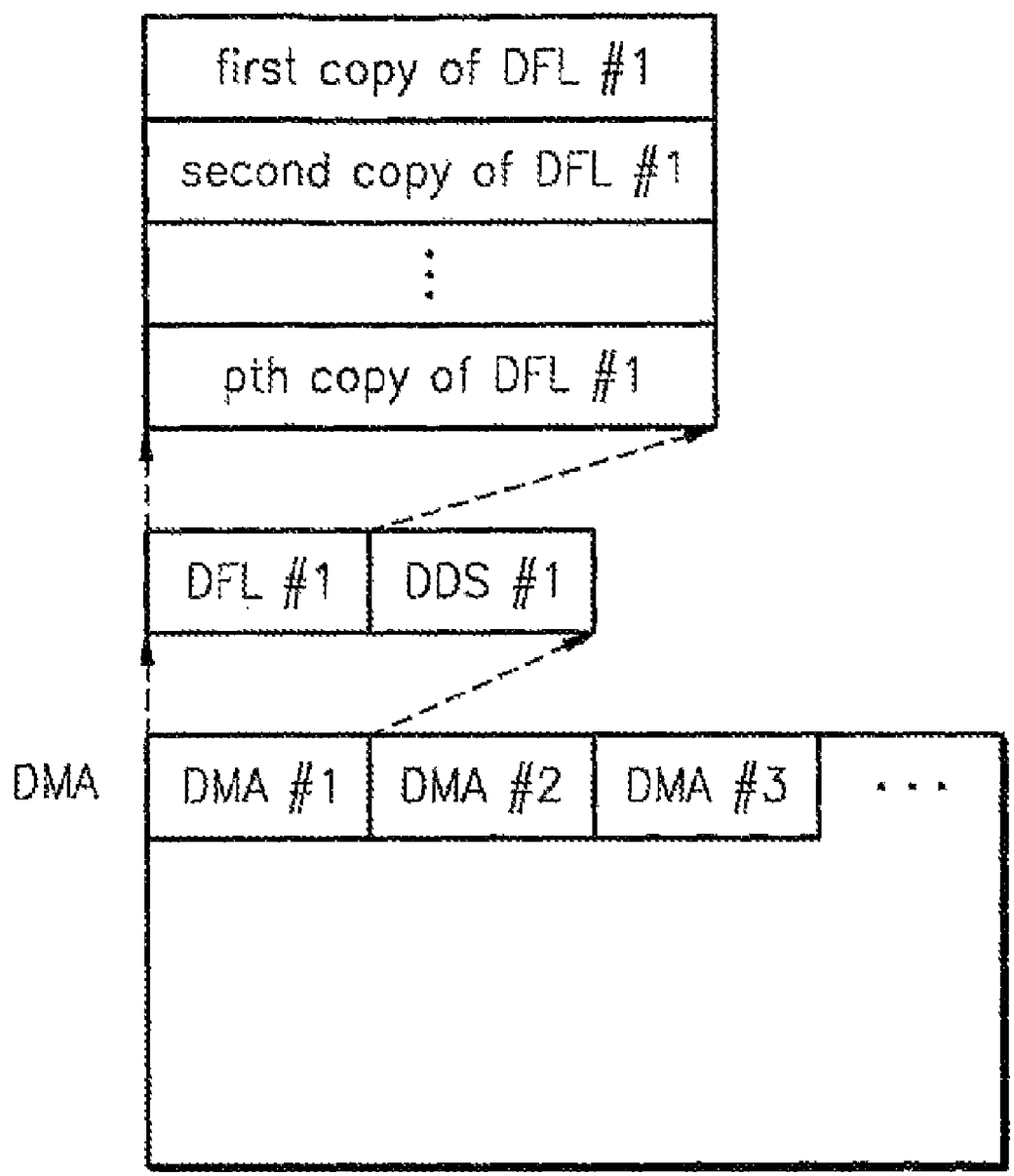

Referring to FIG. 4C, corresponding defect information and defect management information are recorded to form pairs in a DMA. In the DMA, management information DMA #1, DMA #2, DMA #3, . . . are sequentially recorded starting from the start of the DMA. The management information DMA #1 contains a pair of defect management DDS #1 and defect information DFL #1, management information DMA #2 contains a pair of defect management information DDS #2 and defect information DFL #2, and DMA #3 contains a pair of defect management information DDS #3 and defect information DFL #3. Likewise, the defect information DFL #1, DFL #2, and DFL #3, . . . are repeatedly recorded several times to increase the robustness of information. FIG. 4C illustrates repetitive recording of the defect information DFL #1 P times.

Figure 4D:
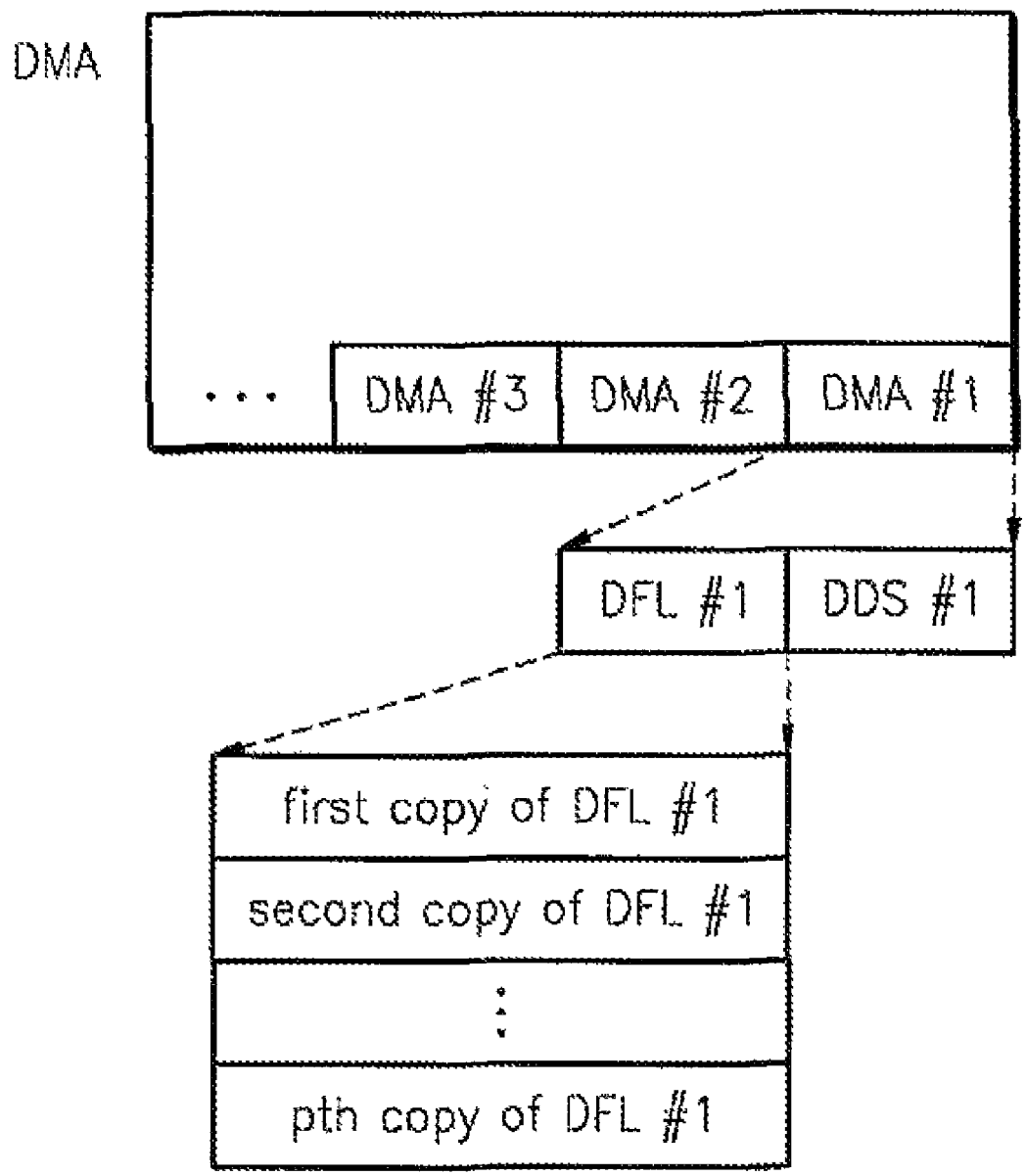

Referring to FIG. 4D, corresponding defect information and defect management information are recorded to make pairs in a DMA but the sequence of recording the information is not the same as shown in FIG. 4C. For example, in the DMA shown in FIG. 4D, management information DMA #1, DMA #2, DMA #3, . . . are sequentially recorded starting from the end of the DMA. The management information DMA #1 contains a pair of defect management information DDS #1 and defect information DFL #1, the management information DMA #2 contains a pair of defect management information DDS #2 and defect information DFL #2, the management information DMA #3 contains a pair of defect management information DDS #3 and defect information DFL #3. Similarly, the defect information DFL #1, DFL #2, DFL #3, . . . are repeatedly recorded several times to increase the robustness of information. In particular, FIG. 4D illustrates repetitive recording of the defect information DFL #1 P times.

Figure 5A:
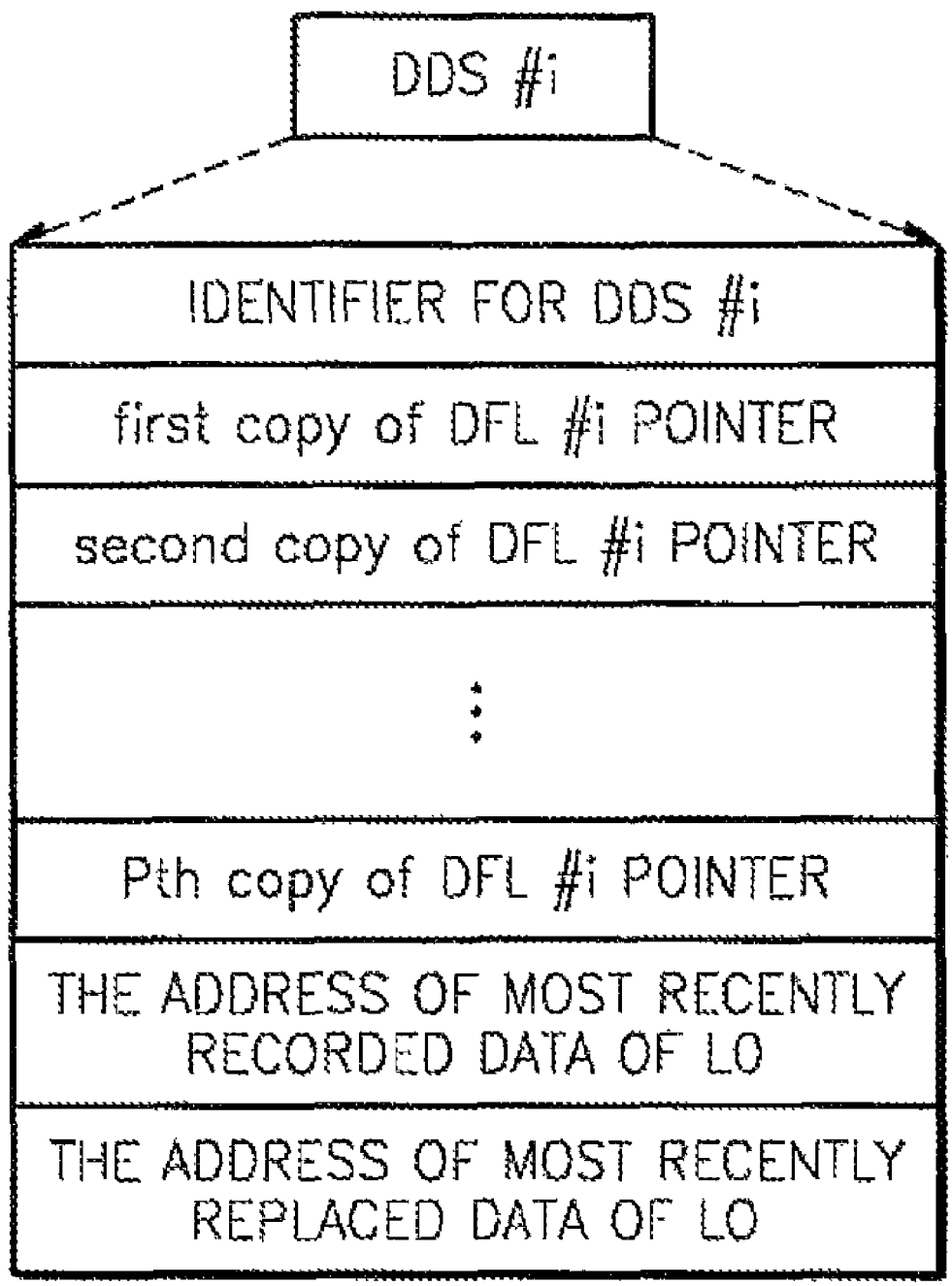
FIGS. 5A and 5B illustrate examples of data structures of defect management information DDS #i according to general aspects.

FIG. 5A illustrates an example of a data structure of defect management information DDS #i recorded on a single record layer disc. Referring to FIG. 5A, the defect management information DDS #i contains an identifier for the DDS #i and information indicating a position of corresponding defect information DFL #i (DFL # i pointer). As previously mentioned related to FIGS. 4A through 4D, the defect information DFL #i according to a general aspect is repeatedly recorded several times, and therefore, the information indicating the position of the defect information DFL #i includes pointers that point out the positions of the repeatedly recorded defect information DFL #i. Referring to FIG. 5A, since the defect information DFL #i is recorded P times, the defect management information DDS #i includes P pointers pointing out the positions of the defect information DFL #i.

Further, the defect management information DDS #i, which is recorded in a single record layer disc, contains the address of a record layer L0, which is most recently recorded in a user data area, and the address of replacement data for the record layer L0, which is most recently recorded in a spare area. In this way, a reproducing apparatus can easily reproduce the disc just by referring to the most recently recorded information. A detailed description thereof will be described below.

Figure 5B:
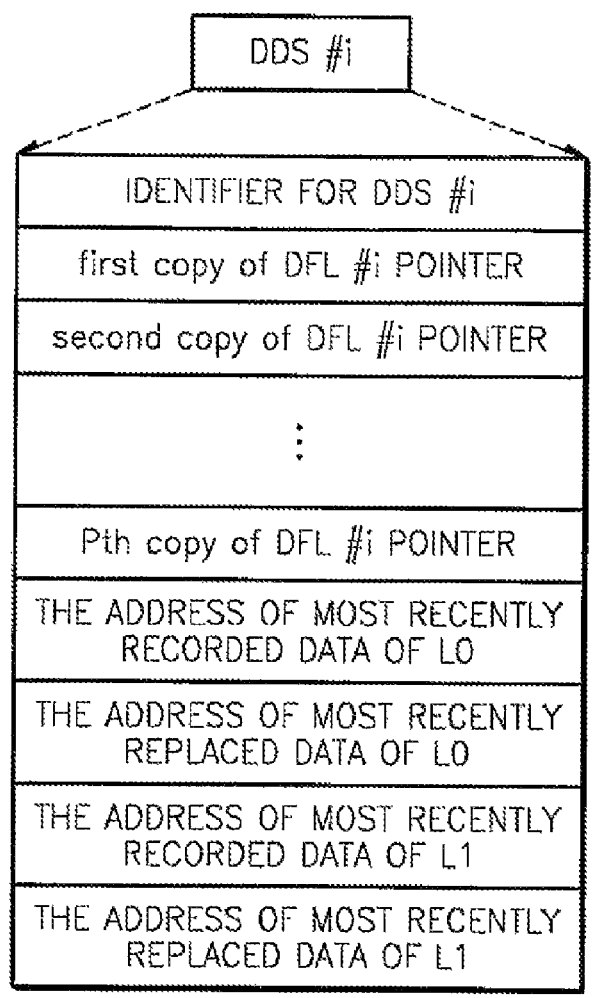

FIG. 5B illustrates an example of a data structure of defect management information DDS #i recorded on a double record layer disc. The defect management information DDS #i includes an identifier thereof and information regarding the position of corresponding defect information DFL #i. As previously mentioned with reference to FIGS. 4A through 4D, the defect information DFL #i according to a general aspect is repeatedly recorded several times, and therefore, the information regarding the position of the defect information DFL #i contains pointers pointing out the positions of the repeatedly recorded defect information DFL #i. As shown in FIG. 5B, since the defect information DFL #i is recorded P times, P pointers are included in the defect management information DDS #i.

Also, the defect management information DDS #i, which is recorded in a double record layer disc, contains the address of a first record layer L0, which is most recently recorded in a user data area, the address of replacement for the first record layer L0, which is most recently recorded in a spare area, the address of a second record layer L1, which is most recently recorded in the user data area, and the address of replacement for the second record layer L1, which is most recently recorded in the spare area. In this way, a reproducing apparatus can easily reproduce the disc just by referring to the most recently recorded information. A detailed description thereof will be described below.

Figure 6:
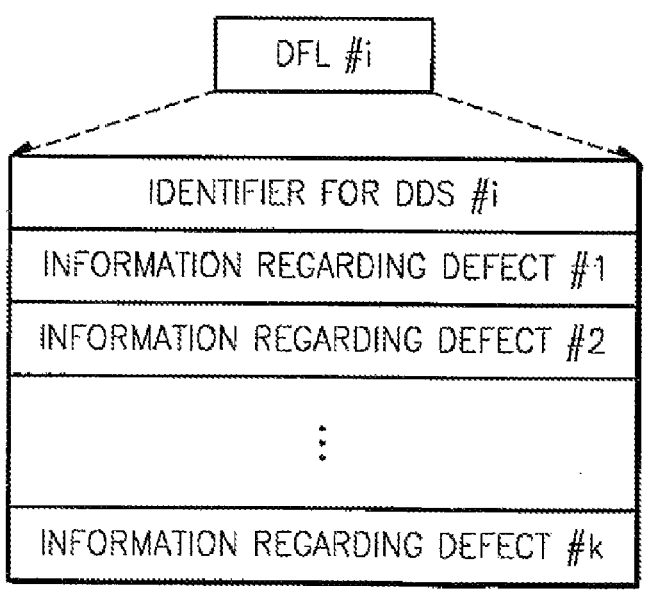
FIG. 6 illustrates an example of a data structure of defect information DFL #i according to a general aspect.

FIG. 6 illustrates an example of a data structure of defect information DFL #i. Referring to FIG. 6B, defect information DFL #i contains an identifier thereof, and information regarding defect #1, defect #2, . . . , and defect #K (K is an integer). Each of the information regarding defect #1, defect #2, . . . , and defect #K provides state information indicating the position of the defect, the position of replacement for the defect, and whether an area having the defect is a single defect block or a continuous defect block. A detailed description of the data structure will be described below.

Figure 7:
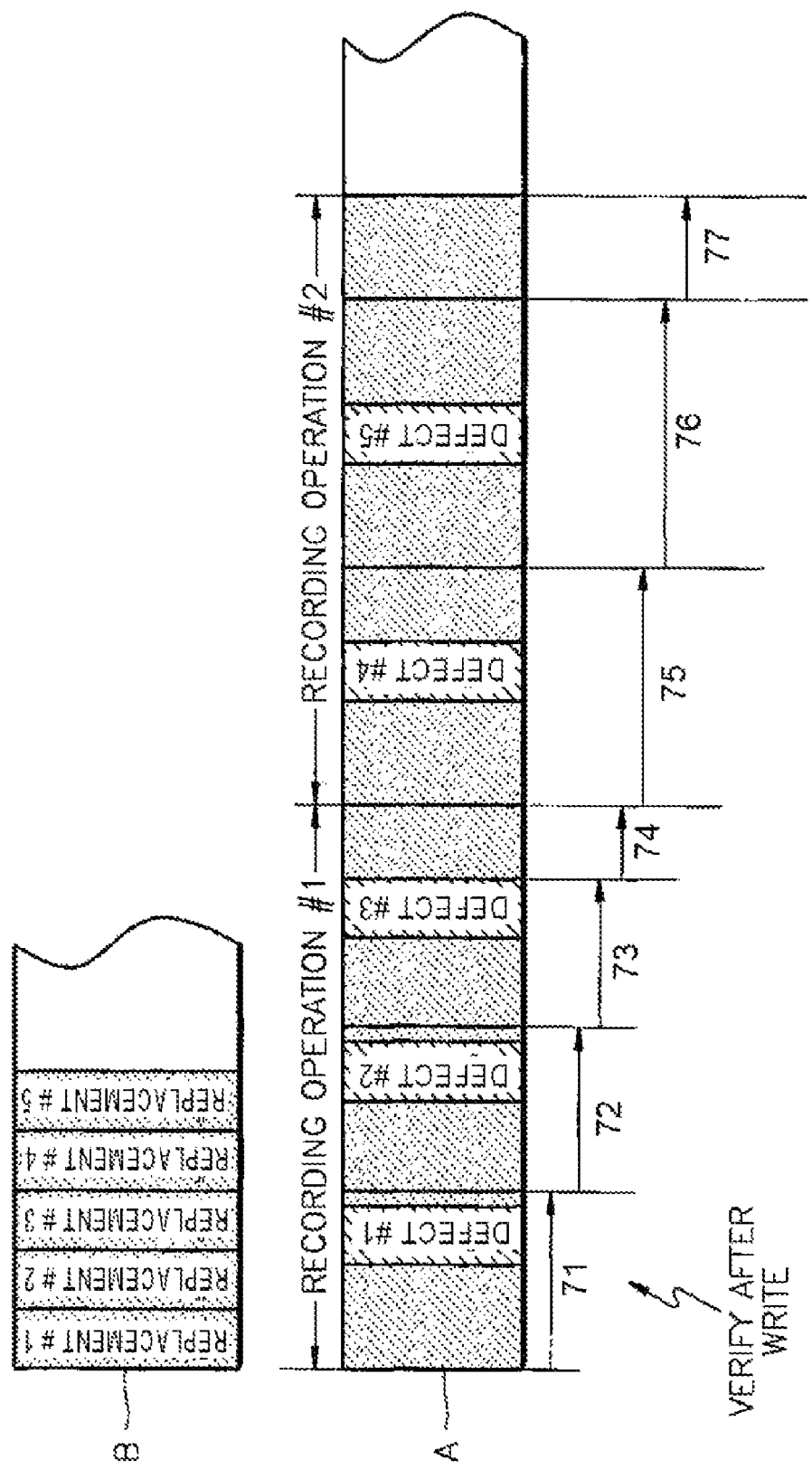
FIG. 7 is a diagram illustrating an example for explaining recording of data in a user data area A and a spare area B, according to a general aspect.

FIG. 7 is a diagram illustrating an example for explaining recording of data in a user data area A and a spare area B according to a general aspect.

Data can be processed in units of sectors or clusters. A sector denotes a minimum unit of data that can be managed in a file system of a computer or in an application, and a cluster denotes a minimum unit of data that can be physically recorded on a disc at once. In general, one or more sectors constitute a cluster.

There are two types of sectors: a physical sector and a logical sector. The physical sector is an area on a disc where a sector of data is to be recorded. An address for detecting the physical sector is called a physical sector number (PSN). The logical sector is a unit in which data can be managed in a file system or an application. An address for detecting the logical sector is called a logical sector number (LSN). A disc recording/reading apparatus detects the recording position of data using a PSN. When recording data on a disc, the entire data is managed in units of LSNs in a computer or in an application and the position of data is detected using an LSN. The relationship between an LSN and a PSN is changed by a controller of the recording/reading apparatus, based on whether the disc contains a defect and an initial position of recording data.

Referring to FIG. 7, A denotes a user data area and B denotes a spare area in which PSNs are allocated to a plurality of sectors (not shown) in ascending order. In general, each LSN corresponds to at least one PSN. However, since LSNs are allocated to non-defective areas, including replacement areas of the spare area B, in ascending order, the correspondence between the PSNs and the LSNs is not maintained when a disc has a defective area, even if the size of a physical sector is the same as that of a logical sector.

In the data area A, sections 71 through 77 denote predetermined units of data in which the verify-after-write method is performed. A recording apparatus records user data in the section 71, returns to the start of the section 71, and checks if the user data is appropriately recorded or a defect exists in the section 71. If a defect is detected in a portion of the section 71, the portion is designated as defect #1. The user data recorded in the defect #1 is also rewritten to a portion of the spare area B. Here, the portion of the spare area B in which data recorded in the defect #1 is rewritten is called replacement #1. Next, the recording apparatus records user data in section 72, returns to the start of the section 72, and checks whether the data is properly recorded or a defect exists in the section 72. If a defect is detected in a portion of the section 72, the portion is designated as defect #2. Likewise, a replacement #2 corresponding to the defect #2 is formed in the spare area B. Further, defect #3 and replacement #3 are designated in section 73 of the user data area A and the spare area B, respectively. In section 74, a defect does not exist and a defective area is not designated.

The recording apparatus records information regarding the defects #1, #2, and #3 designated in the sections 71 through 74 as a defect information list DFL #1 in the DMA when recording operation #1 is expected to end, after recording and verifying to the section 74, i.e., when a user presses the eject button of a recording apparatus or recording of user data allocated in a recording operation is complete. Also, defect management information for managing the defect information list DFL #1 is recorded as defect management information DDS #1 in the DMA.

When a second recording operation starts, data is recorded in sections 75 through 77, and defects #4 and #5 and replacements #4 and #5 are formed in the user data area A and the spare area B in the DMA, respectively, as performed in the section 71. Defect #5 is a continuous defect block in which defects occur continuously, whereas the defects #1, #2, #3, and #4 are single defect blocks, each block in which a defect occurs. The replacement #5 is a continuous replacement block that is the replacement for the defect #5. Here, a block refers to a physical or logical unit of data in which data is recorded. If the second recording operation is expected to end, the recording apparatus records information regarding the defects #4 and #5 as defect information DFL #2, and records the information contained in the defect information DFL #1 once again. Thereafter, defect management information for managing the defect information DFL #2 is recorded in the DMA.

Figure 8:
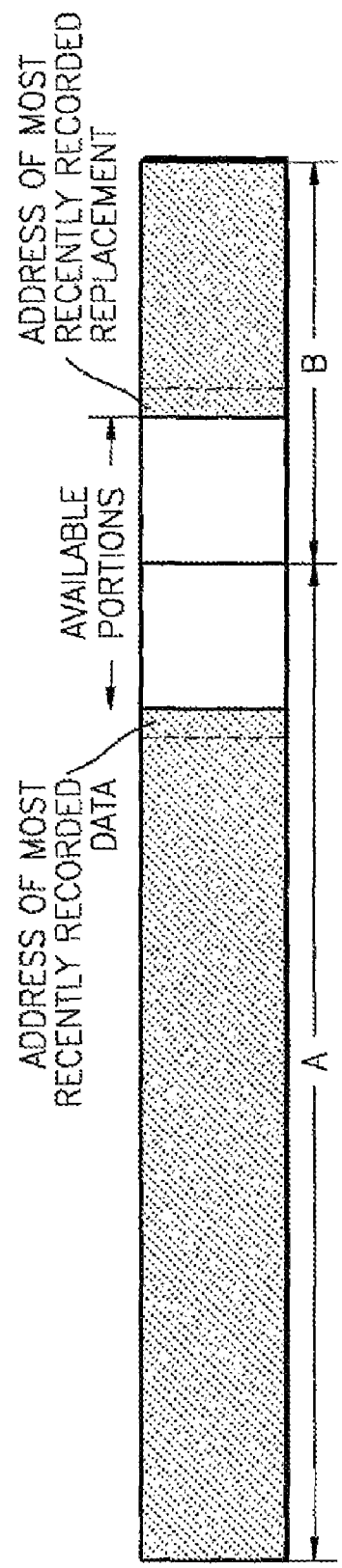
FIG. 8 is a diagram illustrating an example of effective use of a data area according to a general aspect.

FIG. 8 is a diagram illustrating effective use of a data area according to an embodiment of a general aspect. Referring to FIG. 8, it is easy to detect an available portion of the data area, using the address of user data that is most recently recorded in a user data area and the address of data in a spare area that is a replacement for a defect. In particular, the available portion can be more easily detected, when the user data is recorded from the inner part or outer part of the user data area to the outer part or inner part, respectively, and the data, which is replacement for the detect, is recorded from the outer part or inner part of the spare area to the inner part or outer part, respectively. In other word, the user data and the data for replacement are preferably recorded in an opposite recording direction.

The data, which is most recently recorded in the user data areas of record layers L0 and L1, has a physical address with the largest number when physical addresses of user data are increased from the inner part of the record layer L0 to the outer part and increased from the outer part of the record layer L1 to the inner part. In contrast, the most recently recorded replacement has a physical address with the smallest number when physical addresses of replacements are reduced from the outer part to the inner part in a spare area of the record layer L0 and increased from the inner part to the outer part in a spare area of the record layer L1.

Accordingly, as previously mentioned, if the addresses of the most recently recorded data and replacement are included in defect management information DDS #i, it is possible to detect the positions of data and replacement to be newly recorded without completely reading defect information DFL #i and calculating the positions of defects. Further, available portions of the user data area and the spare area are located physically and continuously, thereby enabling effective use of the user area.

Figure 9A:
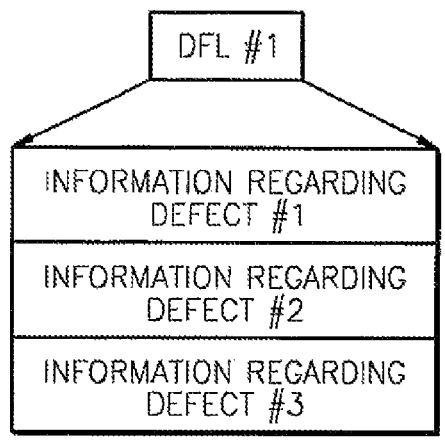
FIGS. 9A and 9B illustrate examples of data structures of defect information DFL #1 and DFL #2 recorded according to the recording of data shown in FIG. 7.
Figure 9B:
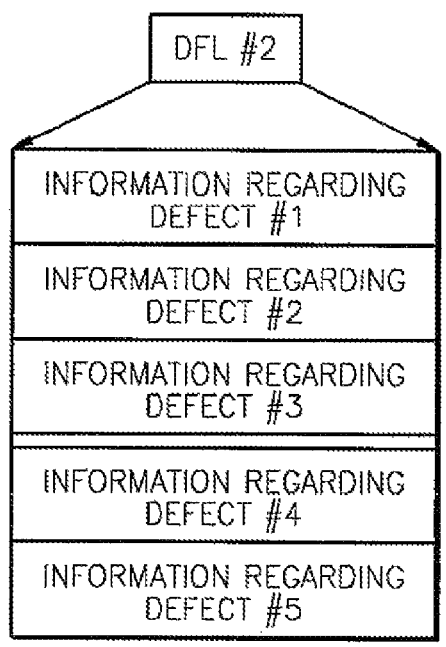
Figure 10:
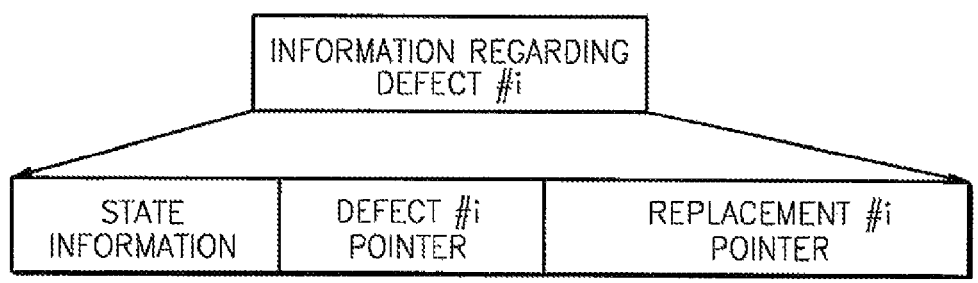
FIG. 10 illustrates an example of a data structure of information regarding defect #i.

FIG. 9 illustrates examples of data structures of defect information DFL #1 and DFL #2 recorded as explained with respect to FIG. 7. FIG. 10 illustrates an example of data structure of information regarding defect #i recorded as explained with reference to FIG. 7.

Referring to FIG. 9, the defect information DFL #1 contains information regarding defects #1, #2, and #3. The information regarding defect #1 indicates the position of an area in which defect #1 exists and the position of an area in which replacement #1 is recorded. The information regarding defect #1 may further include information indicating whether defect #1 is a continuous defect block or a single defect block. Likewise, the information regarding defect #2 indicates whether defect #2 is a continuous defect block or a single defect block, the position of an area in which defect #2 exists, and the position of an area in which replacement #2 is recorded. The information regarding defect #3 indicates whether defect #3 is a continuous defect block or a single defect block, the position of an area in which defect #3 exists, and the position of an area in which replacement #3 is recorded.

The defect information DFL #2 further contains information regarding defects #4 and #5 in addition to the information contained in the defect information DFL #1. That is, the defect information DFL #2 includes the information regarding defect #1, the information regarding defect #2, the information regarding defect #3, the information regarding defect #4, and the information regarding defect #5.

Referring to FIG. 10, the information regarding defect #i includes state information indicating whether defect #i is a continuous defect block or a single defect block, a pointer pointing out defect #i, and a pointer pointing out replacement #i. If the state information indicates that defect #i is a continuous defect block, the state information describes whether the pointer for defect #i points out the start of the continuous defect block or the end thereof and whether the pointer for replacement #i points out the start of the continuous defect block or the end thereof. If the state information describes the pointer for defect #i as the start of the continuous defect block, the pointer for defect #i is a starting physical sector number (PSN) of the continuous defect block and the pointer for replacement #i is a starting PSN of replacement #i. On the contrary, when the state information describes the pointer for defect #i as the end of the continuous defect block, the pointer for defect #i is an ending physical sector number (PSN) of the continuous defect block and the pointer for replacement #i is an ending PSN of replacement #i. The definition of a continuous defect block using state information enables effective recording of information and saves recording space, although information regarding defects is recorded in units of blocks.

The pointer for defect #i specifies a starting and/or an ending point of defect #i. For instance, the pointer for defect #i may include a starting PSN of defect #i. The pointer for replacement #i specifies a starting and/or ending points of replacement #i. For example, the pointer for replacement #i may include a starting PSN of replacement #i.

Hereinafter, a disc defect management method according to a general aspect will be described with reference to the accompanying drawings.

Figure 11:
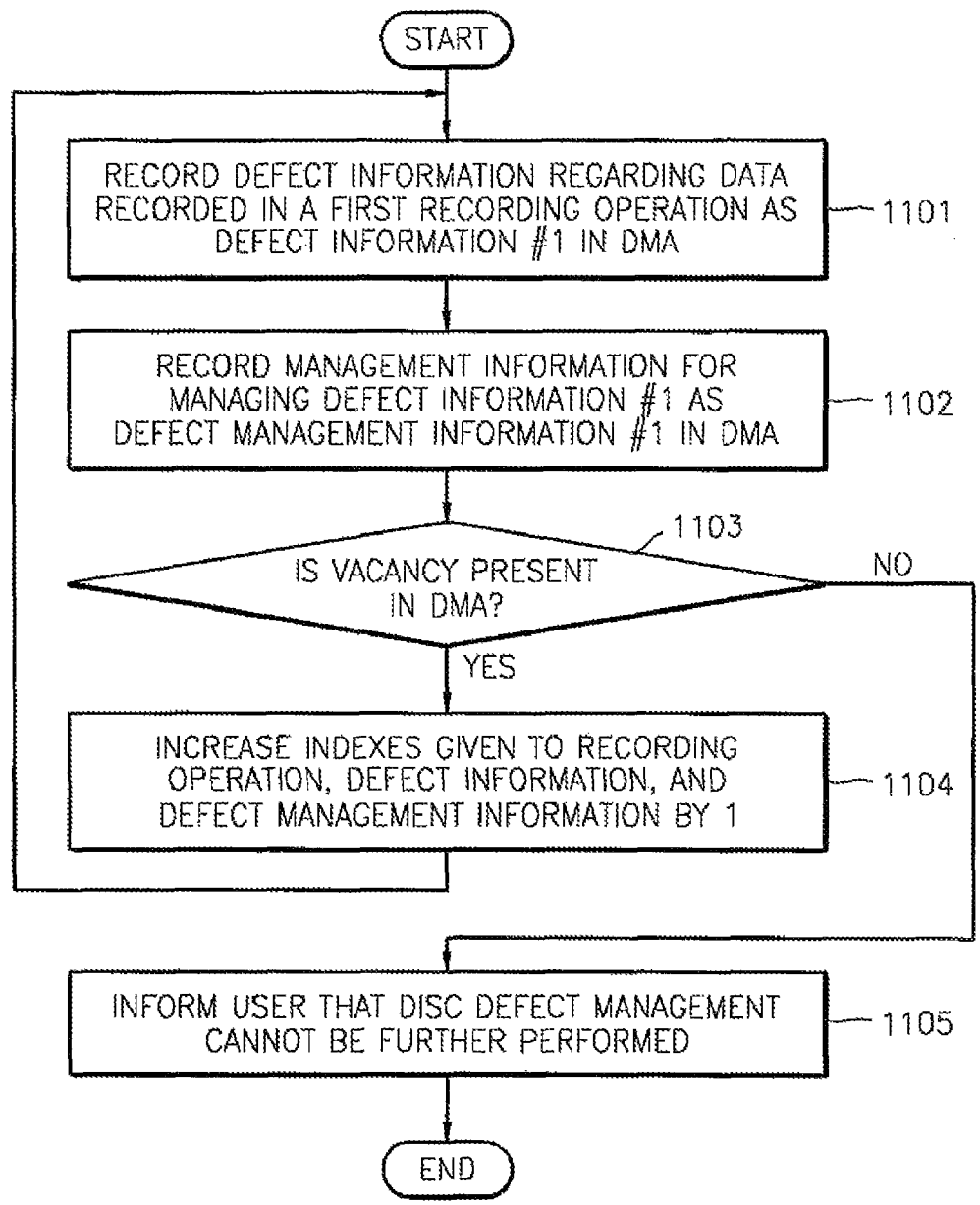
FIG. 11 is a flowchart illustrating an example of a defect management method according to a general aspect.

FIG. 11 is a flowchart illustrating an example of a disc defect management method according to a general aspect. Referring to FIG. 11, in action 1101, a recording apparatus records defect information regarding data recorded according to a first recording operation as defect information #1 in a DMA, so as to manage disc defects. In action 1102, management information for managing defect information #1 is recorded as defect management information #1 in the DMA.

In action 1103, whether a vacancy is present in the DMA is checked. If it is determined in action 1103 that the vacancy is present, actions 1101 and 1102 are repeated while indexes given to a recording operation, defect information, and defect management information are increased by 1, in action 1104. However, if it is determined in action 1103 that the vacancy is not present, a user is informed that disc defect management cannot be further performed in action 1105.

Figure 12:
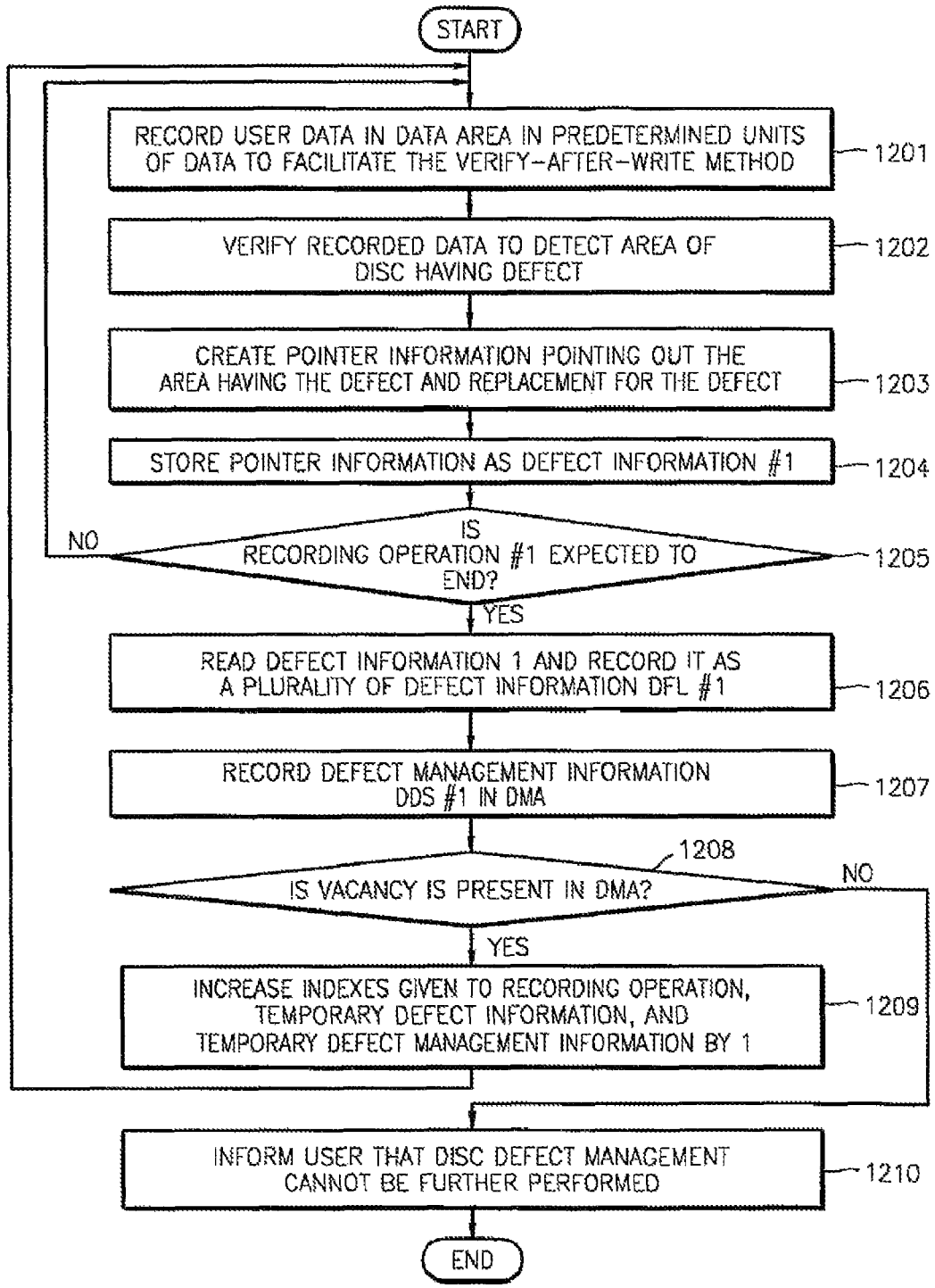
FIG. 12 is a flowchart illustrating an example of a defect management method according to another general aspect.

FIG. 12 is a flowchart illustrating an example of a disc defect management method according to another general aspect. Referring to FIG. 12, user data is recorded in a data area of a disc in units of data to facilitate the verify-after-write method in action 1201. In action 1202, the data recorded in action 1201 is verified to detect an area of the disc having the defect. In action 1203, the controller 2 of FIG. 1 designates the area having the defect as a defective area, controls the recording/reading unit 1 to rewrite data recorded in the defective area to a spare area so as to create a replacement area, and creates pointer information that points out the positions of the defective area and the replacement area. In action 1204, the pointer information is stored as defect information #1. In action 1205, it is checked whether the first recording operation is expected to end. If it is determined in action 1205 that the first recording operation is not expected to end, actions 1201 through 1204 are repeated.

In action 1206, if it is determined in action 1205 that the first recording operation is likely to end, i.e., when the recording of the user data is complete by user input or according to the first recording operation, the stored defect information #1 is read and recorded as defect information DFL #1 in the DMA. In action 1207, management information for managing the defect information DFL #1 is recorded as defect management information DDS #1 in the DMA. In action 1208, whether a vacancy is present in the DMA is checked. If it is determined in action 1208 that the vacancy is present, actions 1201 through 1207 are repeated while increasing indexes given to a recording operation, defect information DFL, defect management information DDS by 1, in action

1209. If it is determined in action 1208 that the vacancy is not present, a user is informed that disc defect management cannot be further performed in action 1210.

According to teachings above, there is provided a disc defect management method that is applicable to write once discs. According to teachings above, disc defect management is performed such that defect information and management information for managing the same are updated and recorded in a defect management area (DMA), thereby enabling effective use of the DMA. Accordingly, user data is recorded even on write once discs while managing disc defects therein, thereby performing backup operations more stably without interruptions.

According to teachings above, there is provided a defect management method and apparatus that can manage disc defects even when a defect is detected during a recording operation, enabling the recording operation to continue without interruption, and a write once disc adapted to use the defect management method.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reproducing apparatus, comprising:
a recording/reading unit that records data on or reads data from a disc comprising a defect management area in which defect information regarding data recorded in a data area of the disc and defect management information for managing the defect information are repeatedly recorded, the defect information comprising first defect information and second defect information, the second defect information comprising information regarding a defective block occurring after the first defect information is recorded, the defect management information comprising location information of the defect information; and
a controller that controls the recording/reading unit to read the defect information and the defect management information from the defect management area, and read data from the disc using the defect information.

* * * * *